US009152527B2

(12) United States Patent
Huang et al.

(10) Patent No.: US 9,152,527 B2
(45) Date of Patent: Oct. 6, 2015

(54) METHOD AND APPARATUS FOR IDENTIFYING WIRELESS PERIPHERALS AND THEIR STATES AT A DOCKING HOST FOR WIRELESS DOCKING

(71) Applicant: QUALCOMM Incorporated, San Diego, CA (US)

(72) Inventors: Xiaolong Huang, San Diego, CA (US); Xiaodong Wang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/757,813

(22) Filed: Feb. 3, 2013

(65) Prior Publication Data

US 2014/0013014 A1     Jan. 9, 2014

Related U.S. Application Data

(60) Provisional application No. 61/669,646, filed on Jul. 9, 2012.

(51) Int. Cl.
*G06F 3/00* (2006.01)
*G06F 11/30* (2006.01)
*G06F 1/16* (2006.01)

(52) U.S. Cl.
CPC .......... *G06F 11/3089* (2013.01); *G06F 1/1632* (2013.01)

(58) Field of Classification Search
None
See application file for complete search history.

(56) References Cited

U.S. PATENT DOCUMENTS

| 7,970,386 | B2 * | 6/2011 | Bhat et al. ................ | 455/414.1 |
|---|---|---|---|---|
| 8,073,980 | B2 | 12/2011 | Kalayjian et al. | |
| 8,161,172 | B2 | 4/2012 | Reisman | |
| 8,266,362 | B2 | 9/2012 | Bhesania et al. | |
| 2005/0235159 | A1 * | 10/2005 | Anandakumar et al. ...... | 713/185 |
| 2007/0123287 | A1 * | 5/2007 | Mock et al. ................ | 455/518 |
| 2010/0322213 | A1 * | 12/2010 | Liu et al. ................... | 370/338 |
| 2011/0142014 | A1 | 6/2011 | Banerjee et al. | |
| 2011/0241827 | A1 * | 10/2011 | Varoglu ..................... | 340/5.52 |

* cited by examiner

*Primary Examiner* — Elias Mamo
(74) *Attorney, Agent, or Firm* — Donald C. Kordich (57) ABSTRACT

Various aspects of the present disclosure enable a docking host that manages a docking environment to establish an initial connection between the docking host and one or more wireless peripheral devices to perform functionality determination of the wireless peripherals devices. The docking host may store the results of the functionality and, upon receiving a request from a dockee to access the functionality that the docking host may provide, will update the results. In one aspect of the disclosed approach, the docking host may determine the current state of the wireless peripheral devices before advertising any functionality information to the dockee. Other aspects, embodiments, and features are also claimed and described.

29 Claims, 5 Drawing Sheets

METHOD AND APPARATUS FOR IDENTIFYING WIRELESS PERIPHERALS AND THEIR STATES AT A DOCKING HOST FOR WIRELESS DOCKING

CROSS-REFERENCE TO RELATED APPLICATIONS

This application claims priority to and the benefit of provisional patent application No. 61/669,646, titled "Method and Apparatus for Identifying Wireless Peripherals and Their States at a Docking Host for Wireless Docking" and filed in the United States Patent and Trademark Office on Jul. 9, 2012, the entire contents of which are incorporated herein by reference.

TECHNICAL FIELD

Aspects of the present disclosure relate generally to wireless docking systems, and more particularly, to a method and apparatus for identifying wireless peripherals and their states at a docking host for wireless docking.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recent interest has been directed toward WLAN connectivity, where a dockee, e.g., a mobile device such as a cellular telephone, can utilize a WLAN interface (e.g., an IEEE 802.11 "Wi-Fi" interface) to establish wireless communication links with one or more peripheral devices. Here, peripheral devices can be any of numerous types, such as a mouse, keyboard, display, printer, camera, speakers, mass storage devices, media servers, sensors, and many others.

As the demand for mobile broadband access continues to increase, research and development continue to advance wireless technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure enable a docking host that manages a docking environment to establish an initial connection between the docking host and one or more wireless peripheral devices to perform functionality determination of the wireless peripheral devices. The docking host may store the results of the functionality determination and, upon receiving a request from a dockee to access the functionality that the docking host may provide, will update the results. In one aspect of the disclosed approach, the docking host may determine the current state of the wireless peripheral devices before advertising any functionality information to the dockee.

In one aspect, the disclosure provides a method operable at a docking host for communicating with a wireless peripheral device, the method including the steps of establishing an initial connection between the docking host and the wireless peripheral device, the initial connection comprising a functionality determination of the wireless peripheral device, storing the functionality information, checking the state of the wireless peripheral device upon receiving a request to retrieve any functionality provided by the docking host, and advertising the functionality information based on the state of the wireless peripheral device.

In another aspect, the disclosure provides a docking host configured for communicating with a wireless peripheral device, including means for establishing an initial connection between the docking host and the wireless peripheral device, the initial connection comprising a functionality determination of the wireless peripheral device, means for storing the functionality information, means for checking the state of the wireless peripheral device upon receiving a request to retrieve any functionality provided by the docking host, and means for advertising the functionality information based on the state of the wireless peripheral device.

In another aspect, the disclosure provides a docking host configured for communicating with a wireless peripheral device, including at least one processor, a memory communicatively coupled to the at least one processor, and a transceiver communicatively coupled to the at least one processor, wherein the at least one processor is configured to establish an initial connection between the docking host and the wireless peripheral device, the initial connection comprising a functionality determination of the wireless peripheral device, to store the functionality information, to check the state of the wireless peripheral device upon receiving a request to retrieve any functionality provided by the docking host, and to advertise the functionality information based on the state of the wireless peripheral device.

In another aspect, the disclosure provides a computer-readable storage medium operable at a docking host configured for communicating with a wireless peripheral device, including instructions for causing a computer to establish an initial connection between the docking host and the wireless peripheral device, the initial connection comprising a functionality determination of the wireless peripheral device, to store the functionality information, to check the state of the wireless peripheral device upon receiving a request to retrieve any functionality provided by the docking host, and to advertise the functionality information based on the state of the wireless peripheral device.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless docking system may provide seamless connectivity, enabling a portable device such as a mobile phone, PDA, tablet computer, etc. to connect with a group of peripheral devices without needing wires or a docking connector, a PIN code or elaborate pairing process per peripheral, etc. The peripherals may act as a group, which needs only to be set up once. Many different types of peripherals may be supported, including bridging of legacy peripherals. Ideally, the best link, protocol, and QoS would be automatically set up for each type of peripheral connection, such as 2.4, 5, or 60 GHz, etc. The best connection may be selected depending on the application (e.g., for a productivity application, for watching videos, or for playing games, etc.), and the environment (e.g., home, enterprise, an Internet café, etc.). Here, existing application sessions/connections may be left intact.

Figure 1:
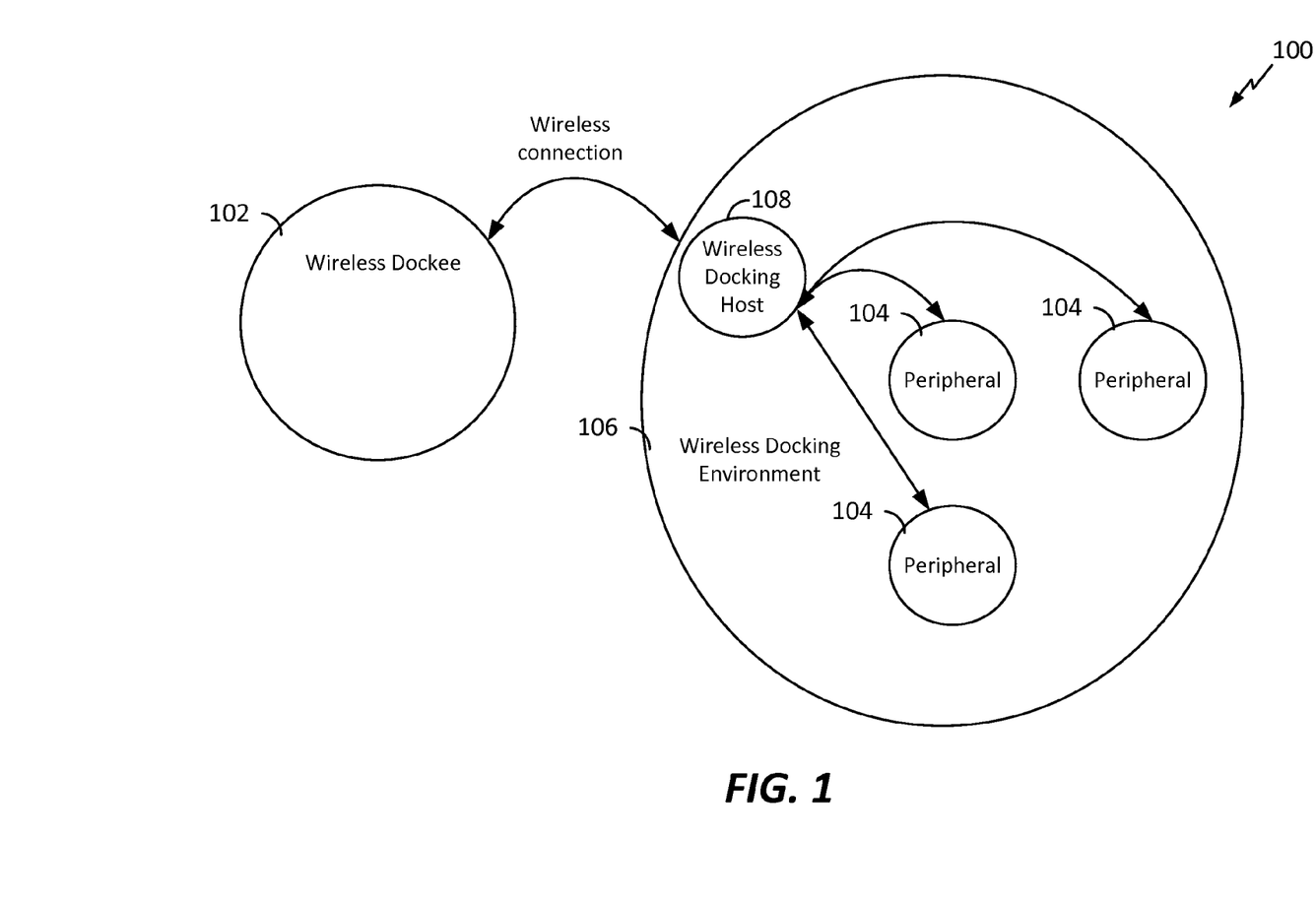
FIG. 1 is a simplified schematic diagram of a conventional wireless docking system utilizing a docking environment.

A wireless docking system may provide a wireless connection between a wireless dockee and a wireless docking environment. FIG. 1 is a simplified diagram that illustrates a wireless docking system 100 including a dockee 102 in wireless communication with a plurality of peripherals 104 by way of a wireless docking host 108, as a part of a wireless docking environment 106.

The dockee 102 may be any suitable device capable of wirelessly connecting to the wireless docking environment 106 utilizing any suitable communication protocol, which may include but is not limited to IEEE 802.11 "Wi-Fi." By connecting to the wireless docking environment 106, the dockee 102 may be capable of connecting directly or indirectly to each of the peripherals 104 that are part of the wireless docking environment 106.

The wireless docking environment 106 is a group of one or more physical devices, including one or more wireless docking hosts 108 and one or more peripherals 104. A wireless docking environment 106 can take any suitable configuration or topology, for example, including nothing more than a wireless docking host 108, or additionally including one or more peripherals 104.

The peripherals 104 may represent peripheral functions, e.g., logical functions such as physical display output, keyboard input, etc. In general, a peripheral function may be any I/O function implemented in a wireless docking host 108 that can be made available to a wireless dockee 102 through any of various suitable wireless interfaces; any I/O function in an external peripheral device that can be made available to the wireless dockee 102 through the wireless docking host 108, where the external peripheral device may be directly connected to the wireless docking host 108; or any I/O function in an external peripheral device that can be connected directly to the wireless dockee 102, and whose connection to the wireless dockee 102 is set up utilizing information provided by the wireless docking host 108.

The peripherals 104 may in some examples be embodied as physical devices having wired and/or wireless interfaces for communicating with the wireless dockee 102 through the wireless docking host 108. Some nonlimiting examples of peripherals might include LCD monitors, USB speakers, USB keyboards, a mouse, a printer, a scanner, a mass storage device, etc. Some devices that may be included in the examples for the peripherals 104 include a well-known class of devices referred to as a human interface device (HID) class of devices, which is a type of computer device that interacts directly with humans. The interaction may include, and most often takes the form of, input from and output to humans. The term "HID" typically refers to devices implemented in conformity to the USB-HID specification as promulgated by the USB Implementers Forum, Inc.

The wireless docking host 108 may be any suitable device capable of connecting to the wireless dockee 102 and one or more peripherals 104. For example, the wireless docking host 108 may make available to the wireless dockee 102 peripheral functions on external peripherals 104 that are connected to the docking host 108 directly, as well as peripheral functions the wireless docking host 108 itself may implement (e.g., a display). As noted in the discussion related to the plurality of peripherals 104, the peripherals may be of the HID class of devices such as the USB-HID class of devices. Generally, there are 2 entities in the HID protocol—a "host" and a "device". The device, which may be any one of the peripherals 104 in various aspects of the approaches described herein, is the entity that directly interacts with a human, such as a keyboard or mouse. The host communicates with the device and receives input data from the device on actions performed by the human. Output data flows from the host to the device and then to the human. The most common example of a host is a computer, but some cell phones and PDAs also can be hosts. In various aspects of the approach disclosed herein, because the wireless dockee 102 is in wireless communication with the plurality of peripherals 104 by way of the wireless docking host 108 as a part of a wireless docking environment 106, the wireless dockee 102 may communicate with the plurality of peripherals 104 either directly or through the wireless docking host 108.

Figure 2:
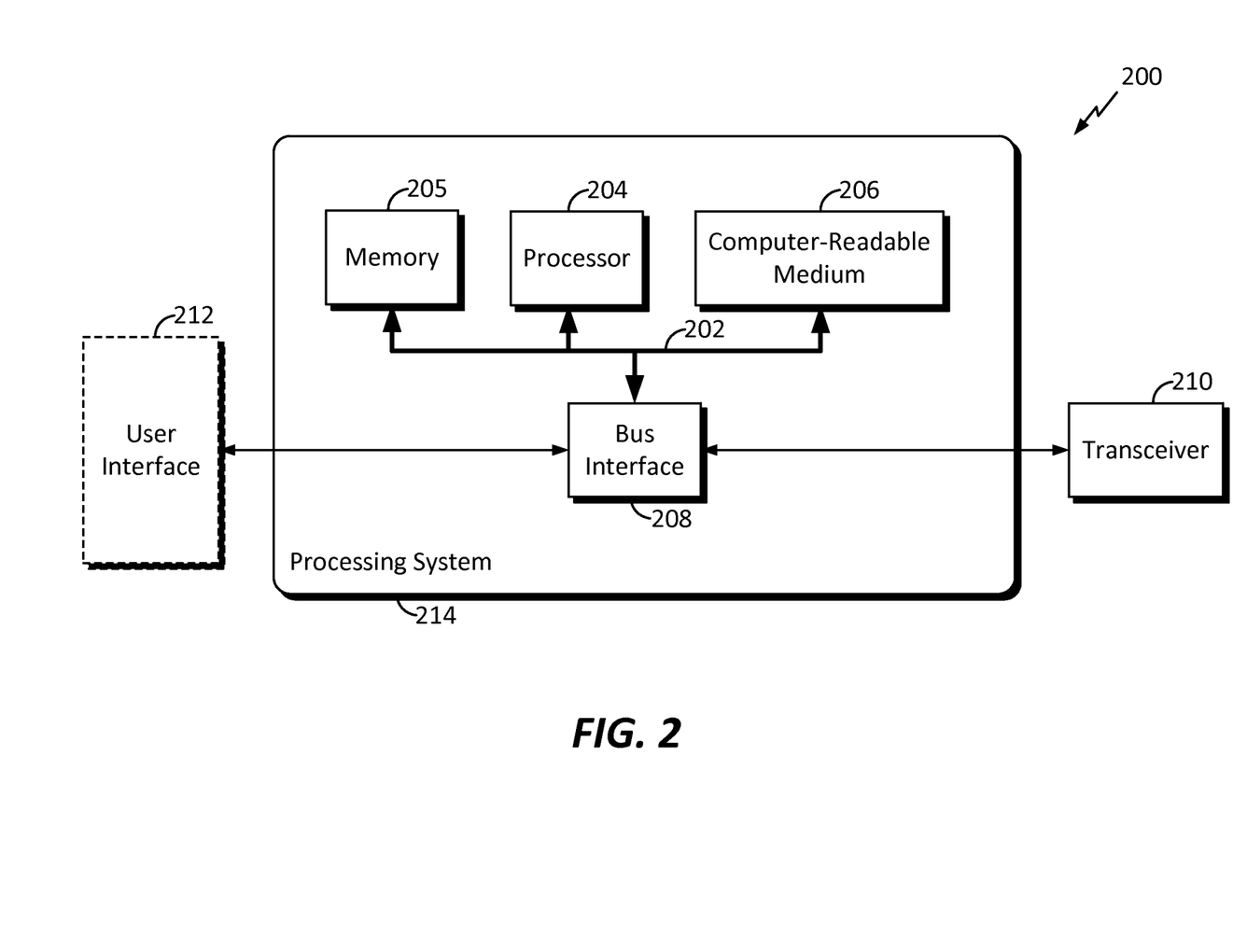
FIG. 2 is a block diagram illustrating an example of a hardware implementation for an apparatus employing a processing system.

FIG. 2 is a conceptual diagram illustrating an example of a hardware implementation for an apparatus 200 employing a processing system 214. In accordance with various aspects of the present disclosure, an element, or any portion of an element, or any combination of elements may be implemented with a processing system 214 that includes one or more processors 204. For example, in various aspects, the apparatus 200 may represent any one or more of a wireless dockee, a wireless docking host, and/or a peripheral device. Examples of processors 204 that may be utilized in an apparatus 200 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software stored on the computer-readable medium 206. The software, when executed by the processor 204, causes the processing system 214 to perform the various functions described infra for any particular apparatus. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
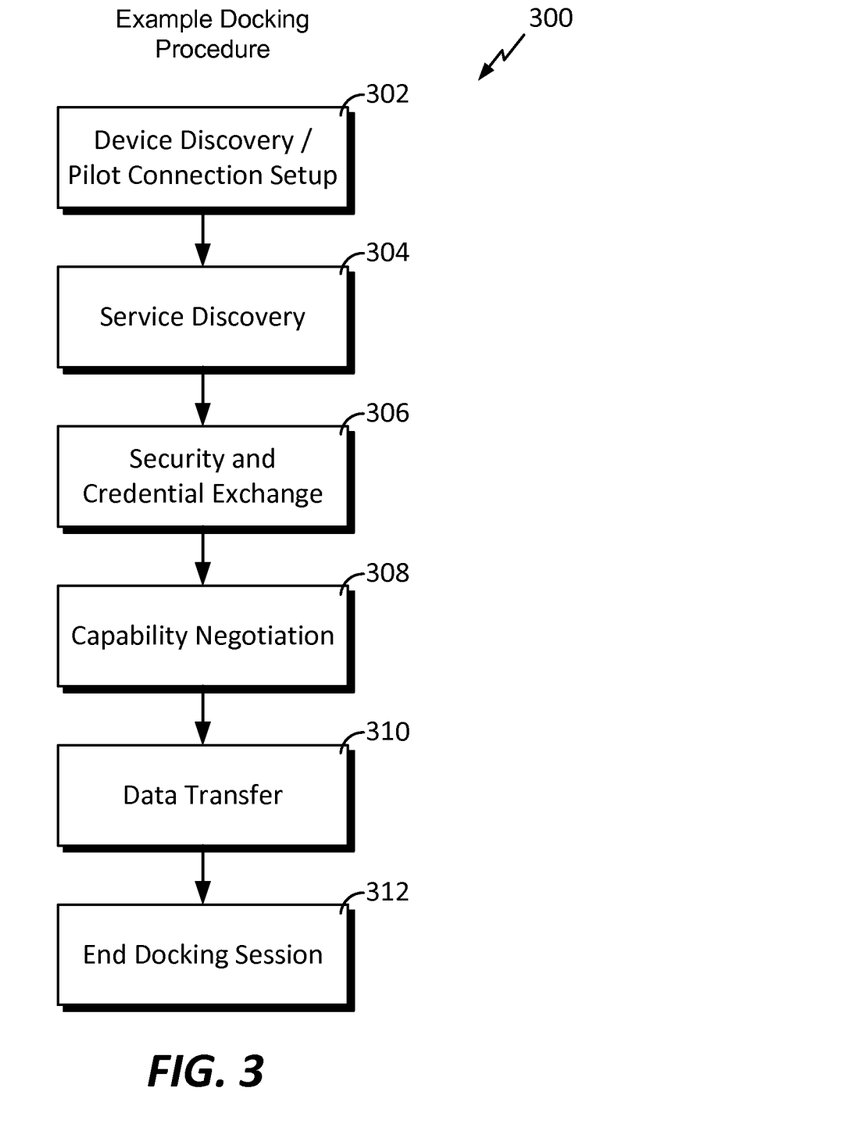
FIG. 3 is a flow chart illustrating a docking procedure according to one example.

The establishment of a docking session between the wireless dockee 102 and the wireless docking host 108 may involve a relatively large number of steps including discovery, negotiation, etc. FIG. 3 illustrates an example of a docking procedure 300 that might be utilized to establish a docking session between a wireless dockee such as the wireless dockee 102 and a wireless docking host such as the wireless docking host 108. The example call flow includes the sequential steps of device discovery at 302, service discovery at 304, security and credential exchange at 306, and capability negotiation at 308, after which the docked devices may begin to transfer data at 310 before ending the docking session at 312.

At 302, the dockee, which may be a device such as a handset or laptop, comes into the vicinity of the docking host and wirelessly connects to the docking host through a device discovery protocol. The docking host manages a group of peripherals that are attached or connected to itself, either wirelessly or wired.

At 304, the docking host advertises its managed peripherals to the dockee over the wireless link between itself and the dockee through a service discovery protocol.

At 306 and 308, the dockee then chooses the peripherals it likes to use and then establishes connections with the peripherals through the docking host or directly with the peripherals using a wireless docking protocol.

At 310, the dockee, the peripherals, and the docking host may transfer data through a data transfer protocol.

At 312, once all data transfers have been completed, the docking session may end. In addition to manually ending the docking session, the docking session may end automatically when the dockee moves out of the vicinity of the docking environment, device sleep mode, or any number of possible scenarios.

In order to advertise the peripherals as part of its offering to the dockee in the docking procedure 300, the docking host needs to identify each peripheral and the function(s) it may provide. For wire-line USB HID peripherals such as keyboards, mice, and other input devices, a docking host such as the wireless docking host 108 only needs to be installed with the HID driver for the particular peripheral device because the HID protocol makes implementation of devices very simple. Devices define their data packets and then present a "HID descriptor" to the docking host. The HID descriptor is a hard coded array of bytes that describe the device's data packets including such information as how many and how large are packets the device supports, as well as the purpose of each byte and bit in the packet. As a non-limiting example, a keyboard with a "Mute" button may inform the docking host that the button's pressed/released state is stored as the 3rd bit in the 7th byte in data packet number 6. Each device typically stores the HID descriptor in ROM and does not need to intrinsically understand or parse the HID descriptor. However, the docking host needs to retrieve the HID descriptor from the device and parse it before it may fully communicate with the device.

The wireless docking host 108 may identify peripherals such as the peripherals 104 and the function(s) it provides by reading the HID descriptors of these devices. As discussed above, for wired devices such as the USB-HID class of devices, this process is well defined. However, various aspects of the wireless docking approach discussed herein may also potentially support such wireless devices as Wi-Fi Serial Bus (WSB) devices, Wi-Fi Display (WFD) sink devices, and WiGig Serial Extension (WSE) devices. Thus, one issue that may be associated with the peripherals 104 that are wireless devices is that the docking host needs to identify the functions those wireless devices provide.

Wireless devices pose other challenges due to their mobility and possible non-existence/non-functionality even after a particular wireless device has been paired with a docking host such as the wireless docking host 108. For example, the wireless docking host 108 may only advertise a peripheral's existence if the peripheral is contemporaneously connected to the wireless docking host 108 at the time of the advertisement, versus having been paired with the wireless docking host 108. Thus, for example, a wireless device that is in sleep mode may only be advertised by the wireless docking host 108 if the wireless docking host 108 may wake the wireless device from sleep mode.

Accordingly, the various aspects of the disclosed approach provide a docking host such as the wireless docking host 108 to identify the peripheral functions those wireless devices provide as well as to know the current state of managed wireless peripherals.

Figure 4:
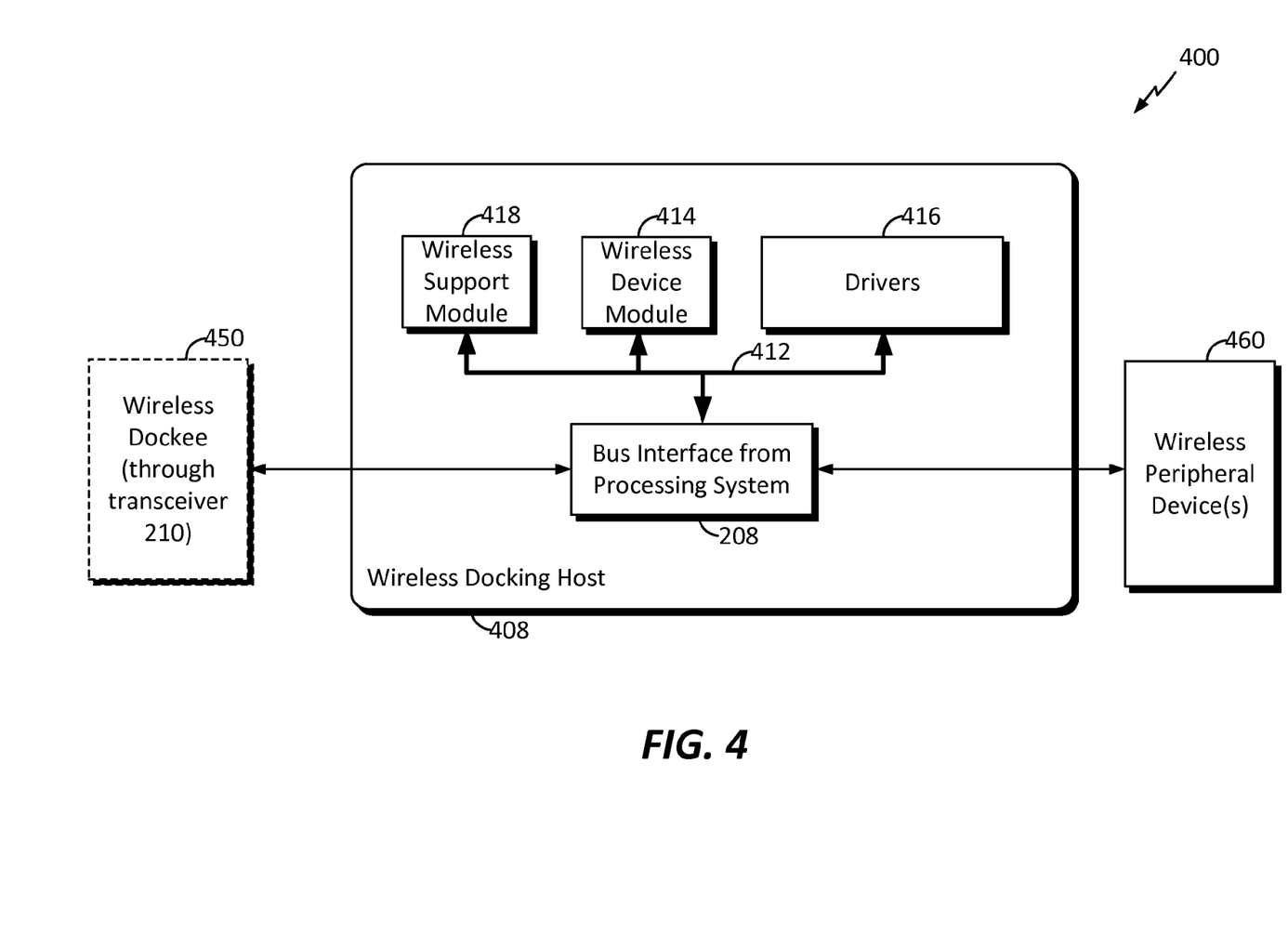
FIG. 4 is a block diagram illustrating an example of a hardware implementation for a wireless docking host configured in accordance with various aspects of the disclosed approach.
Figure 5:
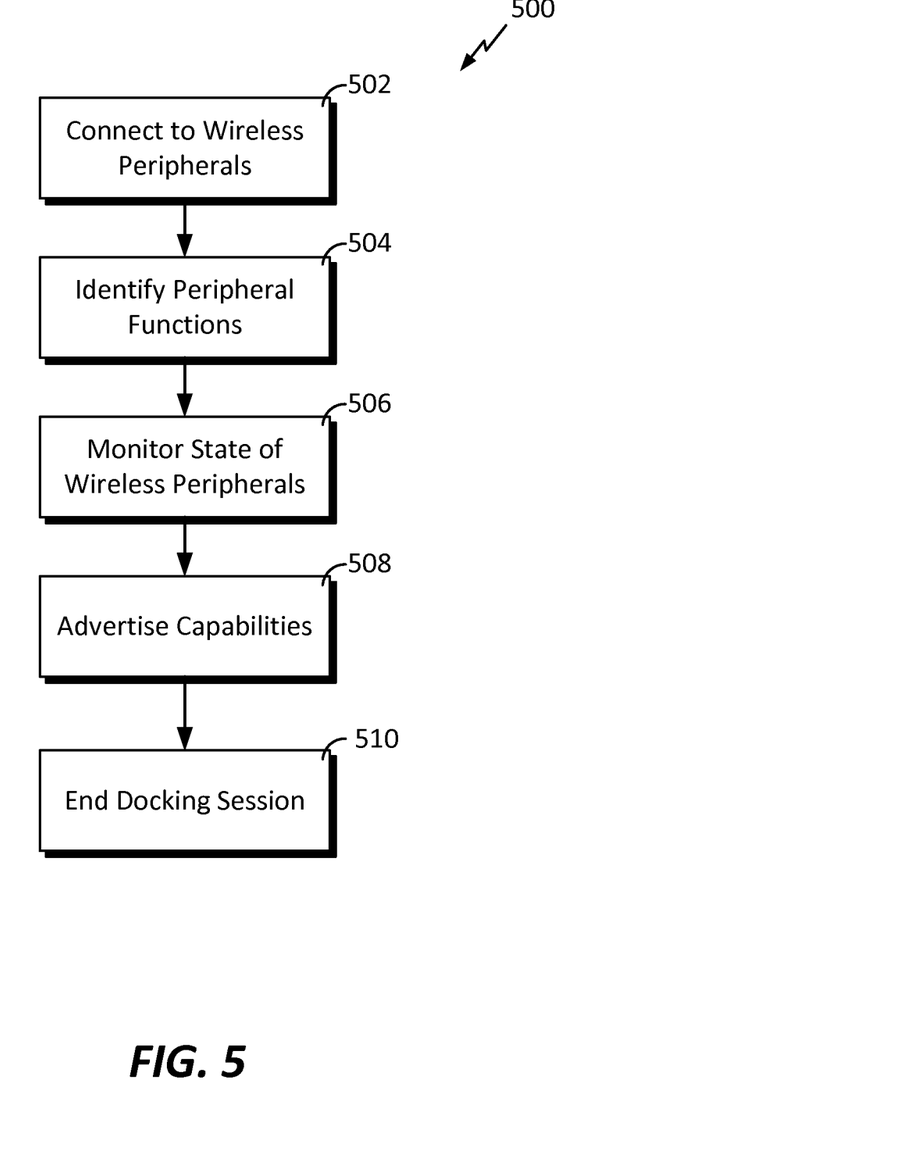
FIG. 5 is a flow chart illustrating a set-up and function advertising procedure for the wireless docking host configured in accordance with various aspects of the disclosed approach.

In one aspect of the disclosed approach, in order to support the peripherals 104 that are wireless peripherals for wireless docking, a docking host such as the wireless docking host 108 may be installed with a wireless host module and an USB driver. FIG. 4 illustrates a wireless docking system 400 that includes a wireless docking host 408, which may include the various modules of the apparatus 200 in addition to those modules described below. Reference will also be made to FIG. 5.

At 502, the wireless docking host 408 may connect with the wireless peripheral devices 460. A wireless support module 418 may be used, along with drivers 416, to support the wireless peripheral devices 460 such as WSB devices, WFD sink devices, and WSE devices. The wireless docking host 408 may use wireless support host module 418 to connect to the wireless peripheral devices 460 wirelessly. At 504, in various aspects of the disclosed approach, the wireless support module 418 may communicate with the wireless peripheral devices 460 using an appropriate driver from the drivers 416 to enumerate the devices and endpoints and obtain HID descriptors of those wireless peripherals so to identify their peripheral functions.

For example, to support WSB peripherals for wireless docking, the docking host 408 may be installed with the wireless support module including a WSB host module and USB drivers for the drivers 416. The docking host first uses the WSB host module to connect to the WSB peripherals wirelessly. The WSB host module and the USB driver then enumerate the USB devices and endpoints and obtain HID descriptors of those WSB peripherals so to identify their peripheral functions.

In another example, where the wireless peripheral devices 460 include WFD sink devices for wireless docking, the wireless support module 418 may include a WFD source module. The wireless docking host 408 may first use the WFD source module to connect to the WFD sink devices wirelessly. The WFD source module executes capability negotiation procedure with the WFD sink devices so to obtain the capabilities of the WFD sink devices, such as screen resolution and supported video and audio codecs.

In yet another example, to support WSE peripherals for wireless docking, the wireless support module 418 may include a WSE host module, and the drivers 416 may include USB drivers. The wireless docking host 408 may then first use the WSE host module to connect to the WSE peripherals wirelessly. The WSE host module and the USB driver then enumerate the USB devices and endpoints and obtain HID descriptors of those WSE peripherals so to identify their peripheral functions.

At 506, for the wireless docking host 408 to monitor the state of the wirelessly connected peripherals, the wireless docking host 408 may need to identify whether a peripheral from the wireless peripheral devices 460 is currently connected, disconnected or just in sleep mode.

In one aspect of the disclosed approach, the peripheral does not disconnect itself from the wireless docking host 408 unless it is been asked by the wireless docking host 108 to disconnect. The wireless docking host 408 may not disconnect the peripheral nor ask the peripheral to disconnect unless the wireless docking host 408 may not function or the dockee needs to directly connect to the peripheral. In addition, the peripheral may enter into a sleep mode, but may periodically signal its existence to the wireless docking host 408. For example, the periodic signaling may be performed using Wi-Fi Direct operations or its payload function protocols, depending on whether the device is a WSB, WFD, or WSE device. Thus the wireless docking host 408 may periodically determine the states of the wireless peripheral devices 460 and advertise their capabilities at 508.

In another aspect of the disclosed approach, the peripheral may disconnect itself from the wireless docking host 408 autonomously, or the wireless docking host 408 may disconnect the peripheral or request the peripheral to disconnect as long as the peripheral is not in use. In this approach, the wireless docking host 408 may only advertise a peripheral as a potential peripheral before the wireless docking host 408 confirms its existence. When the wireless docking host 108 is queried by a dockee for its managed peripherals, or is attempted by a dockee to dock, the wireless docking host 108 first connects to all its managed wireless peripherals. Once the peripherals are connected, the wireless docking host 408 may then advertise such peripheral functions as part of its offer at 508.

Several aspects of a wireless docking system have been presented with reference to a system utilizing IEEE 802.11 "Wi-Fi" communication protocols. As those skilled in the art will readily appreciate, various aspects described throughout this disclosure may be extended to other communication systems, network architectures and communication standards. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method operable at a docking host for communicating with a wireless peripheral device, the method comprising:
   establishing an initial connection between the docking host and the wireless peripheral device, the initial connection comprising obtaining functionality information that describes functionality provided by the wireless peripheral device;
   storing the functionality information;
   receiving a request from a dockee to retrieve information regarding wireless peripheral functionality associated with the docking host;
   checking an operating state of the wireless peripheral device upon receiving the request;
   determining, based on the operating state, whether to advertise the functionality information; and
   advertising the functionality information to the dockee based on the determination.

2. The method of claim 1, wherein:
   the operating state of the wireless peripheral device comprises an active mode;
   the determination of whether to advertise comprises determining whether the wireless peripheral device is in the active mode; and
   the advertising comprises transmitting the functionality information based on the determination of whether the wireless peripheral device is in the active mode.

3. The method of claim 1, wherein the establishing the initial connection between the docking host and the wireless peripheral device comprises:
   communicating with the wireless peripheral device using a host module; and
   enumerating the wireless peripheral device using an identifier.

4. The method of claim 3, wherein the identifier comprises a human input device (HID) identifier.

5. The method of claim 1, wherein the checking the operating state of the wireless peripheral device comprises receiving a periodic signal from the wireless peripheral device with information regarding the operating state of the wireless peripheral device.

6. The method of claim 5, wherein the wireless peripheral device is prevented from disconnecting with the docking host unless one or more criteria are met.

7. The method of claim 6, wherein the one or more criteria comprises a requirement for a dockee to directly connect with the wireless peripheral device, the wireless peripheral device is not in active use, or an inability of the docking host to operate with the wireless peripheral device.

8. A docking host configured for communicating with a wireless peripheral device, comprising:
   means for establishing an initial connection between the docking host and the wireless peripheral device, the initial connection comprising obtaining functionality information that describes functionality provided by the wireless peripheral device;
   means for storing the functionality information;
   means for receiving a request from a dockee to retrieve information regarding wireless peripheral functionality associated with the docking host;
   means for checking an operating state of the wireless peripheral device upon receiving the request;
   means for determining, based on the operating state, whether to advertise the functionality information; and
   means for advertising the functionality information to the dockee based on the determination.

9. The docking host of claim 8, wherein:
   the operating state of the wireless peripheral device comprises an active mode;
   the determination of whether to advertise comprises determining whether the wireless peripheral device is in the active mode; and
   the advertising comprises transmitting the functionality information based on the determination of whether the wireless peripheral device is in the active mode.

10. The docking host of claim 8, wherein the means for establishing the initial connection between the docking host and the wireless peripheral device are further configured to:
    communicate with the wireless peripheral device using a host module; and
    enumerate the wireless peripheral device using an identifier.

11. The docking host of claim 10, wherein the identifier comprises a human input device (HID) identifier.

12. The docking host of claim 8, wherein the means for checking the operating state of the wireless peripheral device are further configured to receive a periodic signal from the wireless peripheral device with information regarding the operating state of the wireless peripheral device.

13. The docking host of claim 12, wherein the wireless peripheral device is prevented from disconnecting with the docking host unless one or more criteria are met.

14. The docking host of claim 13, wherein the one or more criteria comprises a requirement for a dockee to directly connect with the wireless peripheral device, the wireless peripheral device is not in active use, or an inability of the docking host to operate with the wireless peripheral device.

15. A docking host configured for communicating with a wireless peripheral device, comprising:
    at least one processor;
    a memory communicatively coupled to the at least one processor; and
    a transceiver communicatively coupled to the at least one processor, wherein the at least one processor is configured to:
       establish an initial connection between the docking host and the wireless peripheral device, the initial connection comprising obtaining functionality information that describes functionality provided by the wireless peripheral device;
       store the functionality information;
       receive a request from a dockee to retrieve information regarding wireless peripheral functionality associated with the docking host;
       check an operating state of the wireless peripheral device upon receiving the request;
       determine, based on the operating state, whether to advertise the functionality information; and
       advertise the functionality information to the dockee based on the determination.

16. The docking host of claim 15, wherein:
    the operating state of the wireless peripheral device comprises an active mode;
    the determination of whether to advertise comprises determining whether the wireless peripheral device is in the active mode; and
    the advertising comprises transmitting the functionality information based on the determination of whether the wireless peripheral device is in the active mode.

17. The docking host of claim 15, wherein the at least one processor, being configured to establish the initial connection between the docking host and the wireless peripheral device, is further configured to:
- communicate with the wireless peripheral device using a host module; and
- enumerate the wireless peripheral device using an identifier.

18. The docking host of claim 17, wherein the identifier comprises a human input device (HID) identifier.

19. The docking host of claim 15, wherein the at least one processor, being configured to check the operating state of the wireless peripheral device, is further configured to receive a periodic signal from the wireless peripheral device with information regarding the operating state of the wireless peripheral device.

20. The docking host of claim 19, wherein the wireless peripheral device is prevented from disconnecting with the docking host unless one or more criteria are met.

21. The docking host of claim 20, wherein the one or more criteria comprises a requirement for a dockee to directly connect with the wireless peripheral device, the wireless peripheral device is not in active use, or an inability of the docking host to operate with the wireless peripheral device.

22. A non-transitory computer-readable storage medium operable at a docking host configured for communicating with a wireless peripheral device, comprising instructions for causing a computer to:
- establish an initial connection between the docking host and the wireless peripheral device, the initial connection comprising obtaining functionality information that describes functionality provided by the wireless peripheral device;
- store the functionality information;
- receive a request from a dockee to retrieve information regarding wireless peripheral functionality associated with the docking host;
- check an operating state of the wireless peripheral device upon receiving the request;
- determine, based on the operating state, whether to advertise the functionality information; and
- advertise the functionality information to the dockee based on the determination.

23. The non-transitory computer-readable storage medium of claim 22, wherein:
- the operating state of the wireless peripheral device comprises an active mode;
- the determination of whether to advertise comprises determining whether the wireless peripheral device is in the active mode; and
- the advertising comprises transmitting the functionality information based on the determination of whether the wireless peripheral device is in the active mode.

24. The non-transitory computer-readable storage medium of claim 22, wherein the instructions for causing a computer to establish the initial connection between the docking host and the wireless peripheral device, are further configured to:
- communicate with the wireless peripheral device using a host module; and
- enumerate the wireless peripheral device using an identifier.

25. The non-transitory computer-readable storage medium of claim 24, wherein the identifier comprises a human input device (HID) identifier.

26. The non-transitory computer-readable storage medium of claim 22, wherein the instructions for causing a computer to check the operating state of the wireless peripheral device, are further configured to receive a periodic signal from the wireless peripheral device with information regarding the operating state of the wireless peripheral device.

27. The non-transitory computer-readable storage medium of claim 26, wherein the wireless peripheral device is prevented from disconnecting with the docking host unless one or more criteria are met.

28. The non-transitory computer-readable storage medium of claim 27, wherein the one or more criteria comprises a requirement for a dockee to directly connect with the wireless peripheral device, the wireless peripheral device is not in active use, or an inability of the docking host to operate with the wireless peripheral device.

29. The method of claim 1, wherein:
- the checking of the operating state of the wireless peripheral device comprises determining whether the wireless peripheral device is connected to the docking host; and
- the functionality information is not advertised to the dockee if the wireless peripheral device is not connected to the docking host.

* * * * *